(12) United States Patent
McKay

(10) Patent No.: US 7,922,401 B2
(45) Date of Patent: Apr. 12, 2011

(54) CAMERA RIG WITH CENTER-OF-GRAVITY CORRECTION SYSTEM

(76) Inventor: Thomas L. McKay, Austin, TX (US)

( * ) Notice: Subject to any disclaimer, the term of this patent is extended or adjusted under 35 U.S.C. 154(b) by 165 days.

(21) Appl. No.: 12/385,218

(22) Filed: Apr. 1, 2009

(65) Prior Publication Data

US 2010/0254696 A1     Oct. 7, 2010

(51) Int. Cl.
G03B 17/00           (2006.01)
(52) U.S. Cl. ........................................... 396/420
(58) Field of Classification Search ........... 396/420–426
See application file for complete search history.

(56) References Cited

U.S. PATENT DOCUMENTS

| | | | |
|---|---|---|---|
| 4,017,168 A | 4/1977 | Brown | |
| 5,360,196 A | 11/1994 | DiGiulio et al. | |
| 5,819,461 A | 10/1998 | Killian | |
| 5,940,645 A | 8/1999 | Bonin | |
| 6,056,449 A | 5/2000 | Hart | |
| 6,188,849 B1 | 2/2001 | Staicouras | |
| 6,354,544 B1 | 3/2002 | Muzila | |
| 6,611,662 B1 * | 8/2003 | Grober | 396/55 |
| 6,685,148 B2 | 2/2004 | Zadok | |
| 6,808,324 B2 | 10/2004 | McKay | |
| 7,241,060 B2 | 7/2007 | Mootz et al. | |
| 2002/0122668 A1 | 9/2002 | Tenzer | |
| 2006/0262274 A1 | 11/2006 | Brown et al. | |

OTHER PUBLICATIONS

U.S. Appl. No. 12/384,492, filed Aug. 21, 2008 (unpublished).
U.S. Appl. No. 12/285,805, filed Oct. 14, 2008 (unpublished).
"DV Media Rig" Brochure, VariZoom Lens Controls (2006).
Varizoom "DV Traveler," http://www.varizoom.com/products/supports/vzdvtraveler.html (retrieved Jun. 18, 2009).
Varizoom "DV Media Rig," http://www.varizoom.com/products/supports/vzDVMediaRig.html (retrieved Jun. 18, 2009).

* cited by examiner

*Primary Examiner* — W. B. Perkey
(74) *Attorney, Agent, or Firm* — Jacobson Holman PLLC

(57) ABSTRACT

A camera rig with a center-of-gravity correction system, which includes an adjustable shoulder platform, a camera platform connected to the shoulder platform, and an abdominal support system connected to the camera platform. The camera platform is vertically, horizontally, and pivotably movable relative to the shoulder platform, and includes a mechanism for providing center-of-gravity correction for a camera mounted thereon. The abdominal support system is horizontally and vertically adjustable relative to the camera platform.

2 Claims, 11 Drawing Sheets

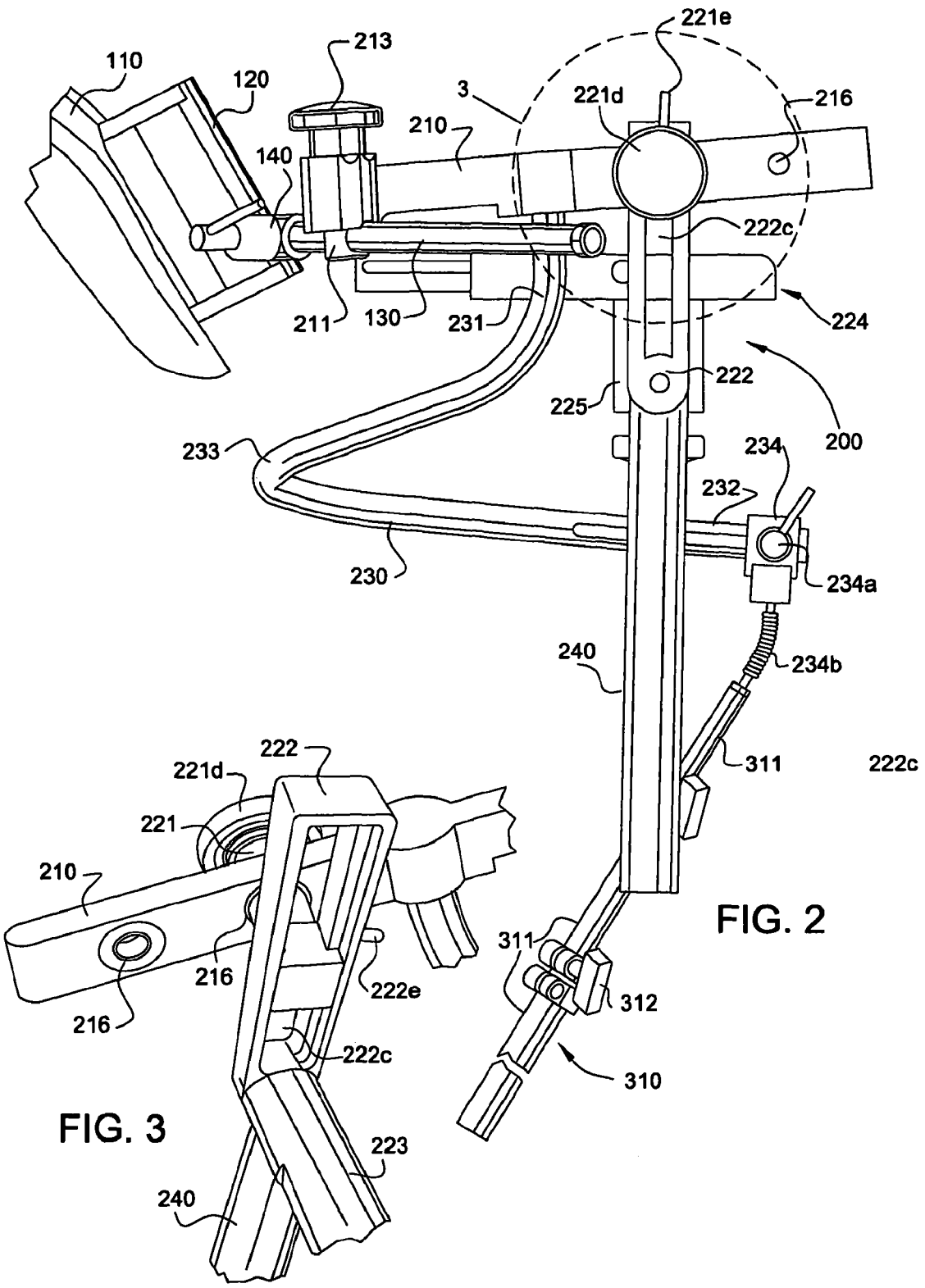

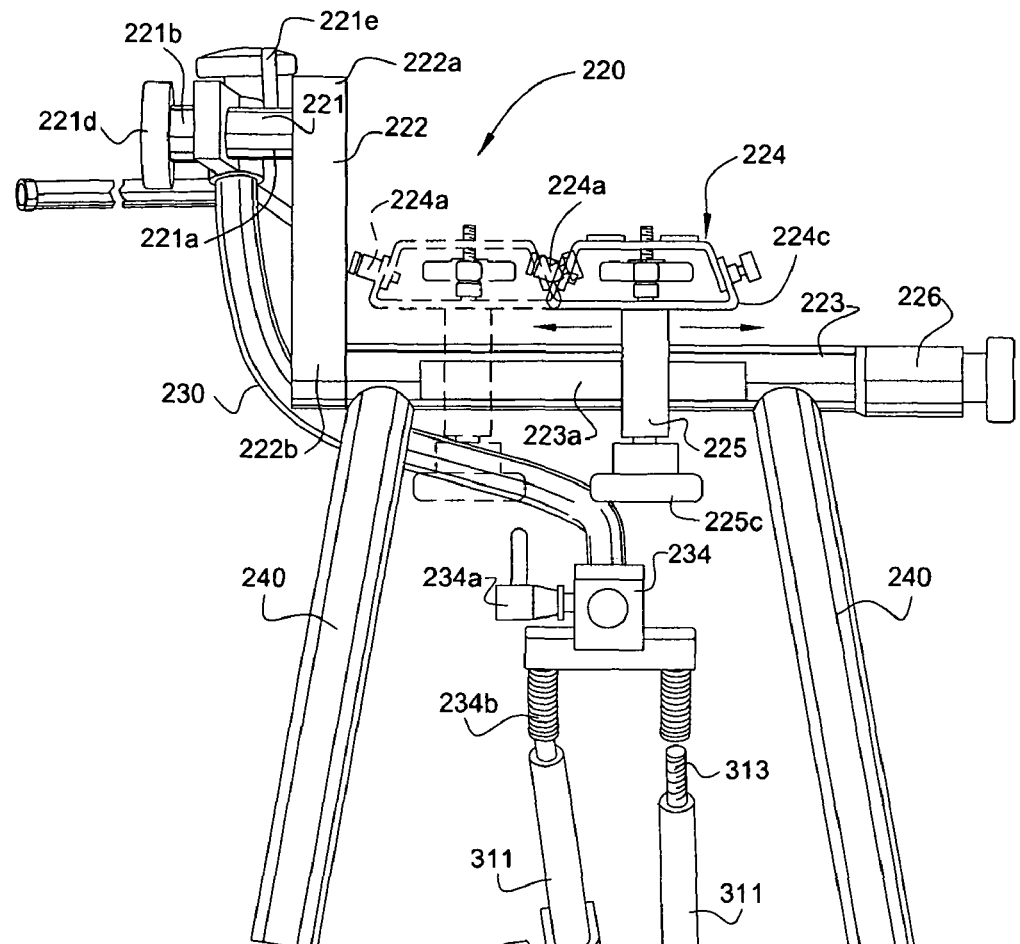
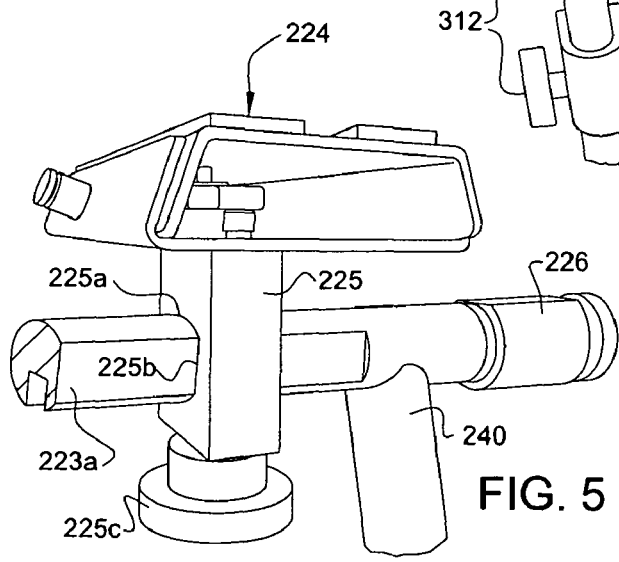
FIG. 4
FIG. 5

CAMERA RIG WITH CENTER-OF-GRAVITY CORRECTION SYSTEM

CROSS-REFERENCE TO RELATED APPLICATIONS

Not applicable.

COPYRIGHTED MATERIAL

Not applicable.

BACKGROUND OF THE INVENTION

1. Field of the Invention

The present invention relates to a camera rig for supporting a camera and the like. More specifically, the invention relates to a camera rig with a center-of-gravity correction system.

2. Related Art

The inventor's co-pending application Ser. No. 12/384,492, filed Aug. 21, 2008, entitled "Camera-Mounting Head With Balance Control," which is incorporated herein by reference in its entirety, discloses a head for mounting a camera on a tripod or jib, which a camera operator can use to exactly balance the camera's center of gravity, and can also use to adjust the camera's pan and tilt without having to tighten the drag control.

The inventor's co-pending application Ser. No. 12/285,805, filed Oct. 14, 2008, entitled "Instrument-Mounting Head With Balance Control," which is also incorporated herein by reference in its entirety, discloses a head for mounting a camera or other instrument on a tripod or jib, which an instrument operator can use to exactly balance the instrument's center of gravity.

While the devices disclosed in application Ser. No. 12/285,805 both have mechanisms that allow a camera operator to balance a camera's center of gravity, they are both manually operated but are used on a stationary platform such as a tripod or jib. Neither device is configured for mobile use, much less mobile use for an extended period of time.

The inventor's "DV Media Rig," which is sold by Vari-Zoom Lens Controls, is configured for mobile use, and addresses the problem of extended use with a shoulder platform and an abdominal support, both of which attach to the camera platform assembly. However, attachment of the abdominal support directly to the rotating/tilting camera mounting rod of the adjustable camera support unduly restricts the operator's ability to tilt the camera.

It is to the solution of these and other problems that the present invention is directed.

SUMMARY OF THE INVENTION

It is accordingly a primary object of the present invention to provide a camera rig for hand-held use for an extended period of time, which provides a center-of-gravity correction system and allows multi-axis adjustments, and in which the camera can be tilted at will by the user.

These and other objects of the invention are achieved by the provision of a camera rig with a center-of-gravity correction system, which includes an adjustable shoulder platform, a camera platform connected to the shoulder platform, and an abdominal support system connected to the camera platform. The camera platform is vertically, horizontally, and pivotably movable relative to the shoulder platform, and includes a mechanism for providing center-of-gravity correction for a camera mounted thereon. The abdominal support system is horizontally and vertically adjustable relative to the camera platform.

Other objects, features and advantages of the present invention will be apparent to those skilled in the art upon a reading of this specification including the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 2 is a partial, enlarged view of the camera rig shown in FIG. 1.

FIG. 3 is a portion of a view of the camera rig as shown in FIG. 2, enlarged for magnification purposes.

FIG. 4 is a front elevational view of the camera rig shown in FIG. 1, the shoulder platform being omitted for clarity.

FIG. 5 is a perspective view of the camera mounting shoe of the camera rig shown in FIG. 1.

DETAILED DESCRIPTION OF THE PREFERRED EMBODIMENTS

Figure 1:
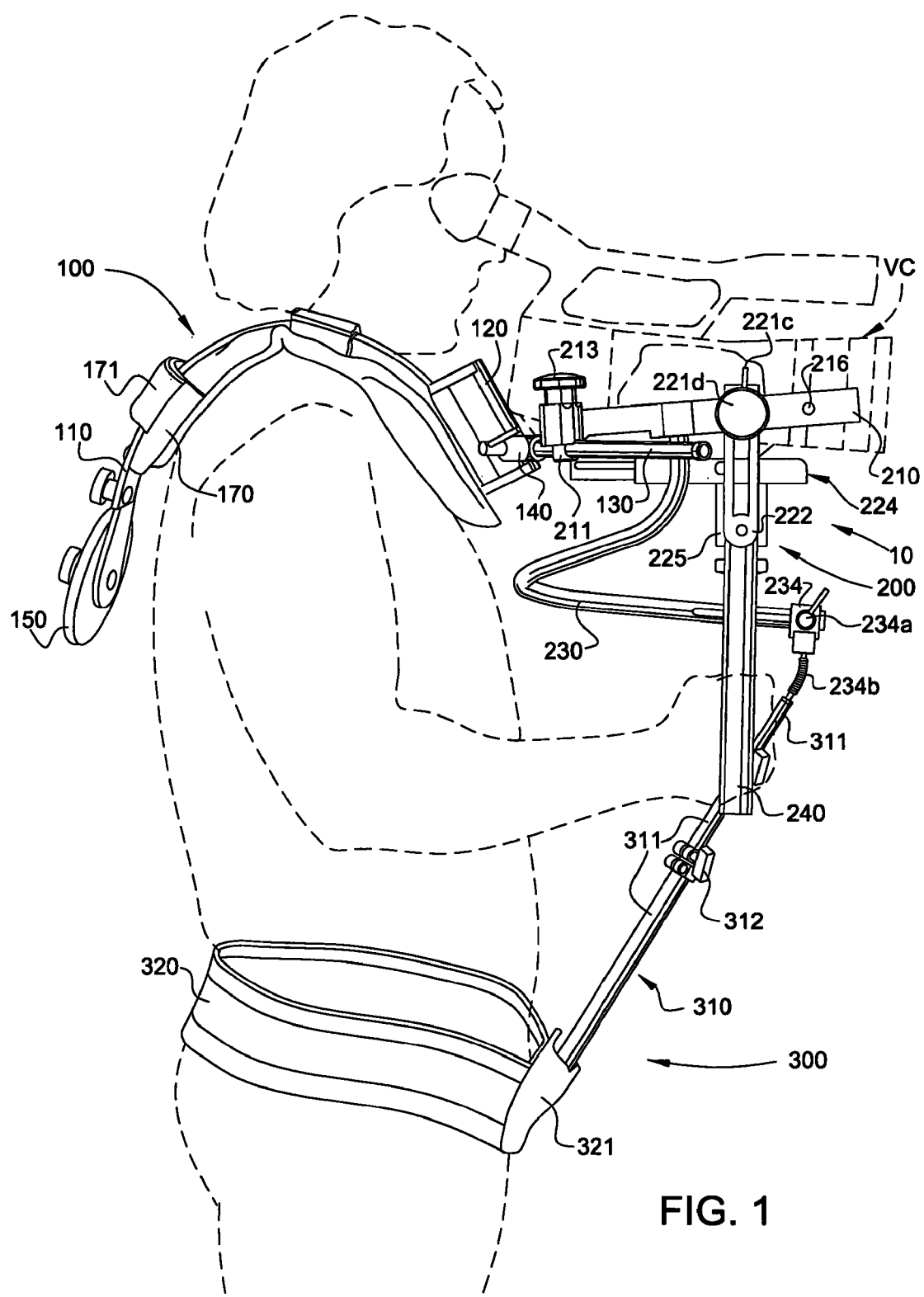
FIG. 1 is a side elevational view of a first embodiment of a camera rig with a center-of-gravity correction system, in accordance with the present invention.
Figure 6:
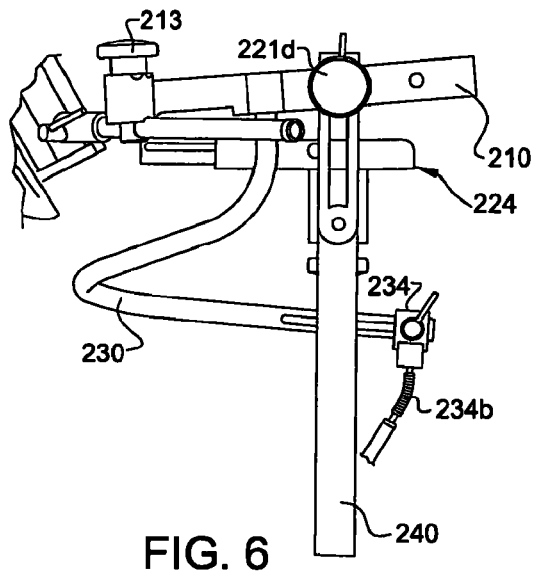
FIGS. 6-9 are partial side elevational views of the camera rig shown in FIG. 1, showing the handles in different positions.
Figure 7:
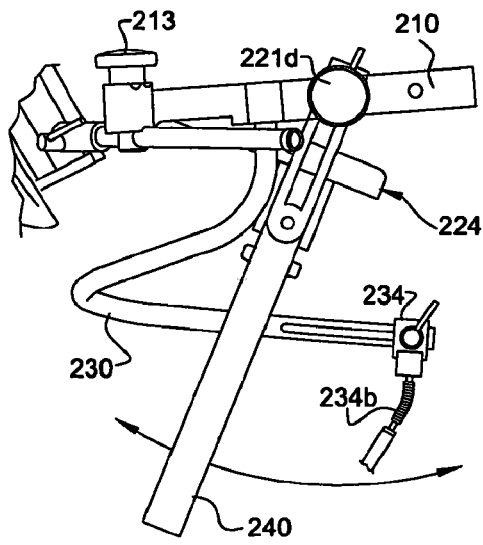
Figure 8:
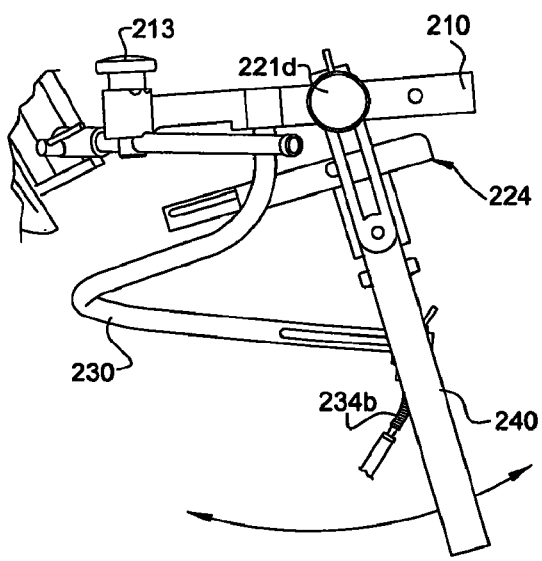
Figure 9:
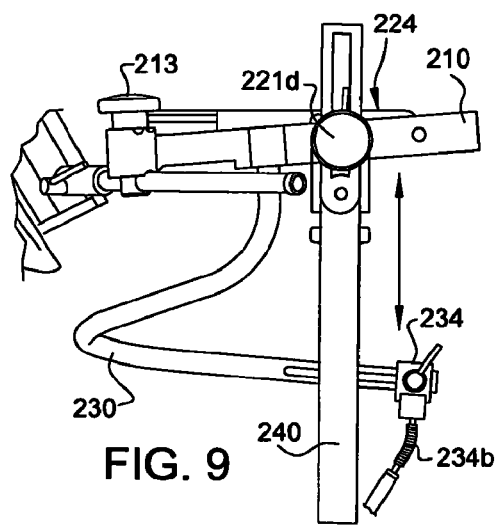

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Figure 10:
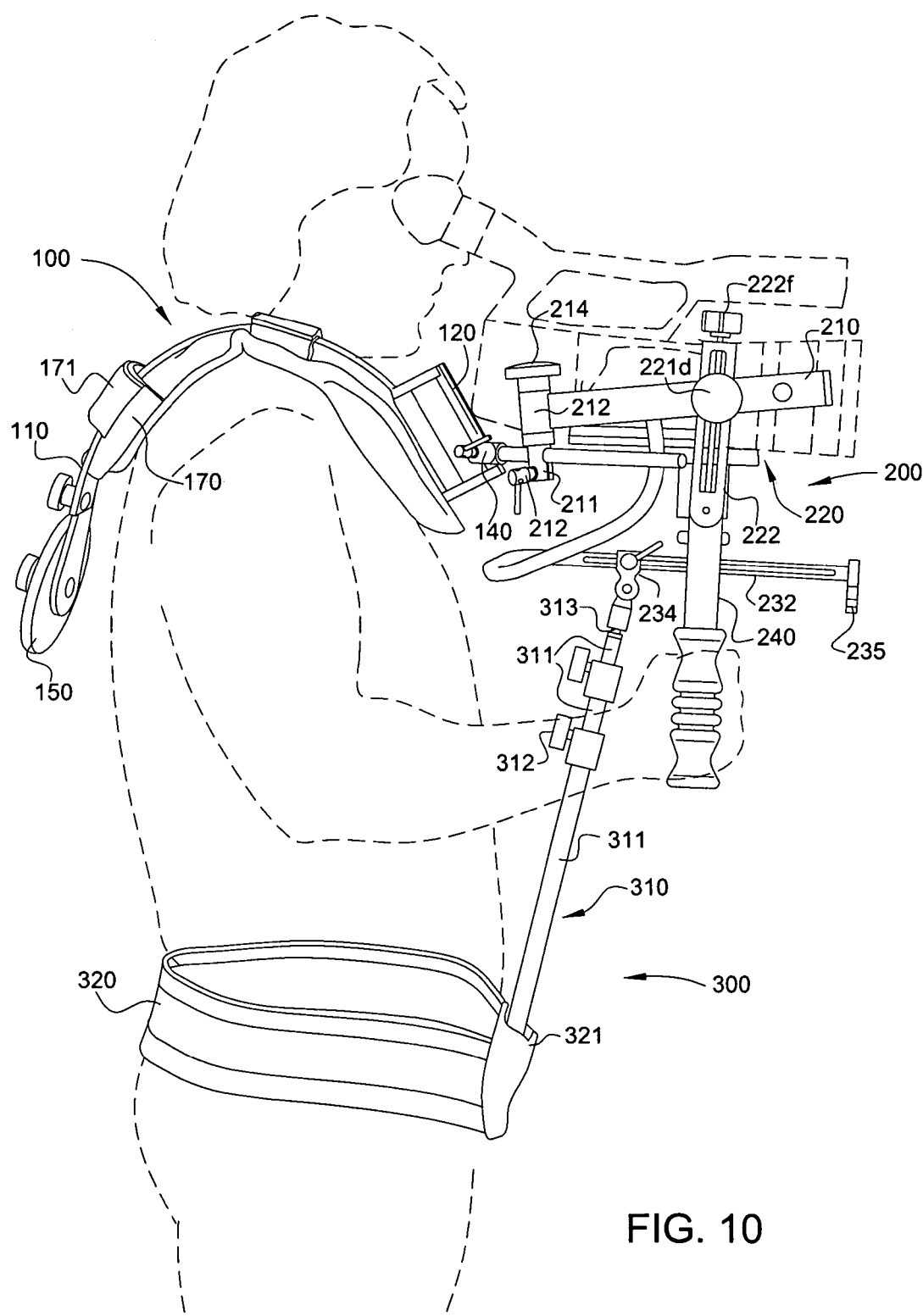
FIG. 10 is a side elevational view of a second embodiment of a camera rig in accordance with the present invention.

As shown in FIGS. 1 and 10, the media rig 10 in accordance with the present invention can be used with video cameras, particularly professional DV and HD cameras and other camera devices that are operated while being carried by the user, and includes an adjustable shoulder platform 100, a camera platform 200 connected to the shoulder platform 100, and an abdominal support system 300 connected to the camera platform 200.

With reference to FIGS. 1 and 10, the shoulder platform 100 includes a shoulder arch 110 with a rail 120 at the front, an attachment arm 130 pivotably and vertically movable on the rail 120 at the user's chest, and an articulating rear counterweight balance system 150 at the back, to assist the user in balancing the camera VC. A locking lever, locking screw, or the like 140 is provided for adjustment of the position of the attachment arm 130 on the rail 120. A conventional battery mount 160 (for example, V-lock or three-stud) can alternatively be used to mount a battery at the back of the shoulder arch 110, in place of the rear counterweight balance system 150, as shown in FIGS. 19-22. Pivoting the attachment arm 130 (also shown in FIGS. 2, 6-9, and 12) allows the user to adjust the camera's eyepiece and/or flip out monitor. A cushion 170 is provided on the shoulder arch 110 for improved comfort. The cushion 170 can be provided with loops 171 that can be opened and closed for removal from and attachment to the shoulder arch 110.

Referring now to FIGS. 2-9, 11, 17, and 18, the camera platform 200 is attached to the attachment arm 130 and provides balancing, horizontal positioning, and a full tilt range for the camera VC. The camera platform 200 includes a suspension arm 210 slidably mounted on the attachment arm 130 of the shoulder platform 100, a center-of-gravity correction system 220, a curved support leg 230 connecting the center-of-gravity correction system 220 to the abdominal support system 300, and left and right handles 240 attached to the center-of-gravity correction system 220.

Figure 11:
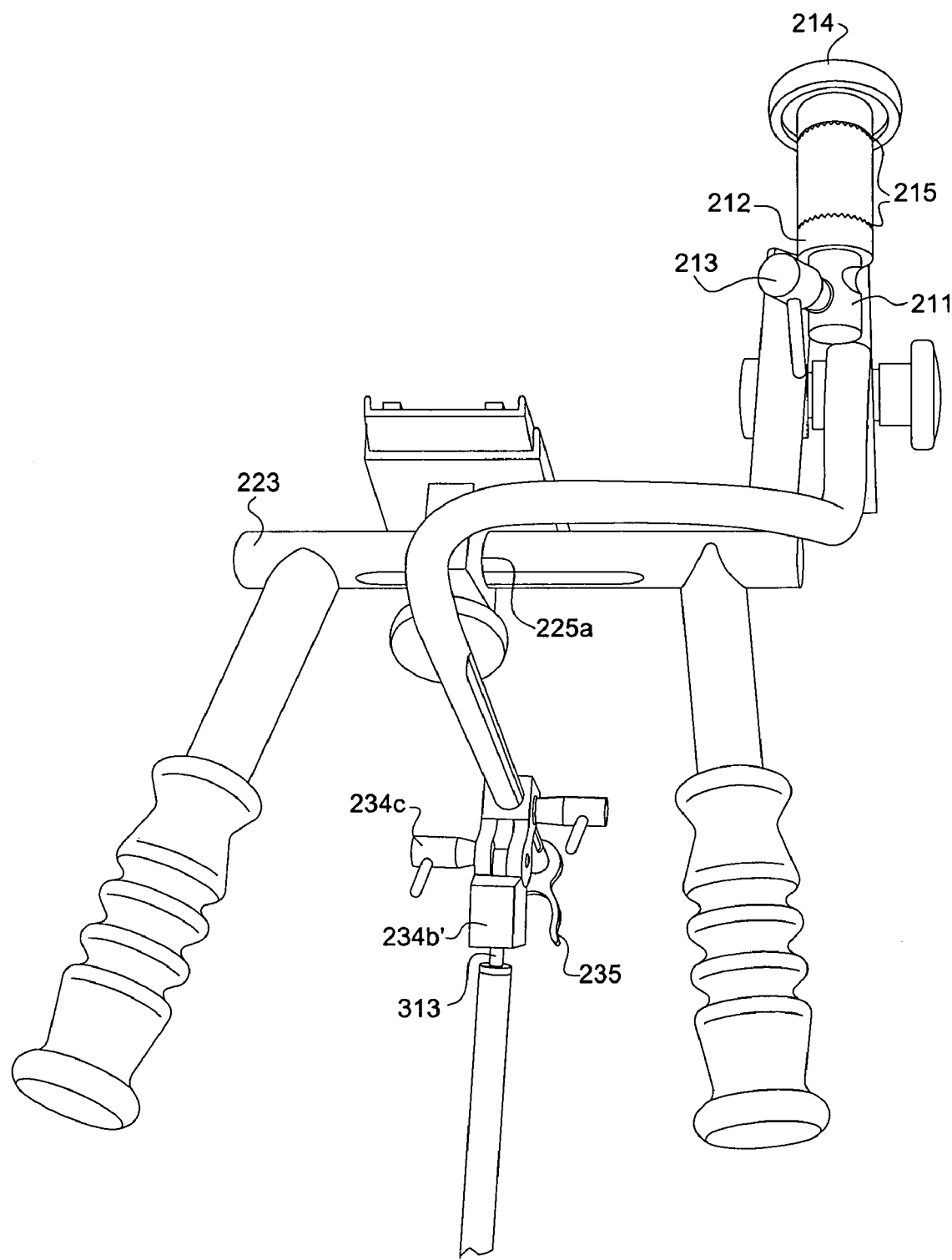
FIG. 11 is rear perspective view of the camera rig shown in FIG. 10, the shoulder platform being omitted for clarity.
Figure 12:
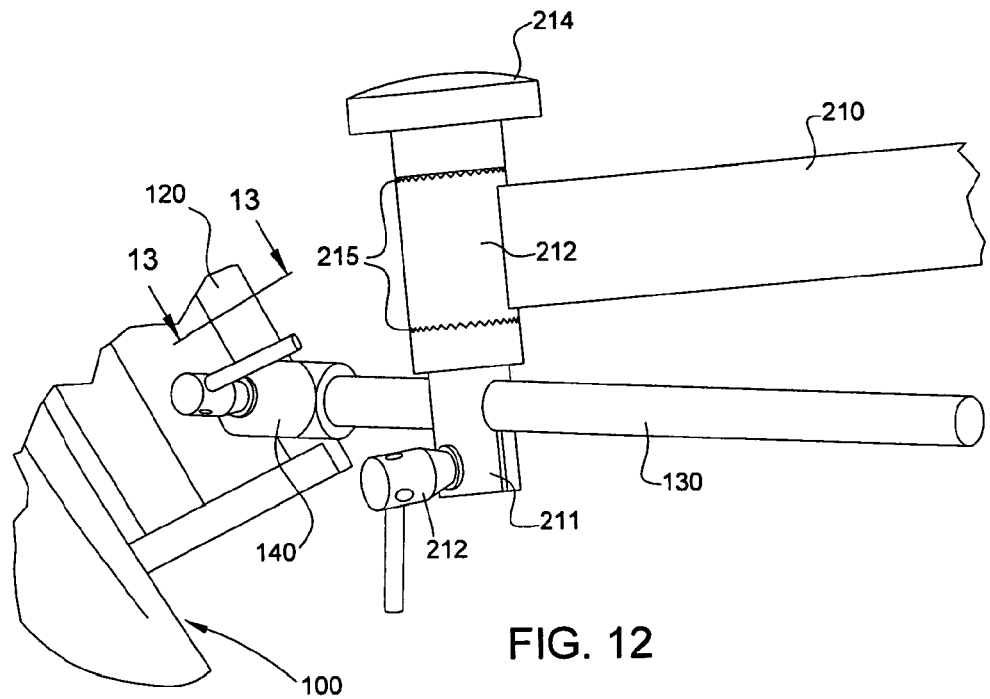
FIG. 12 is an enlarged perspective view of the connection between the shoulder platform and the camera platform of the camera rig shown in FIG. 10.
Figure 13:
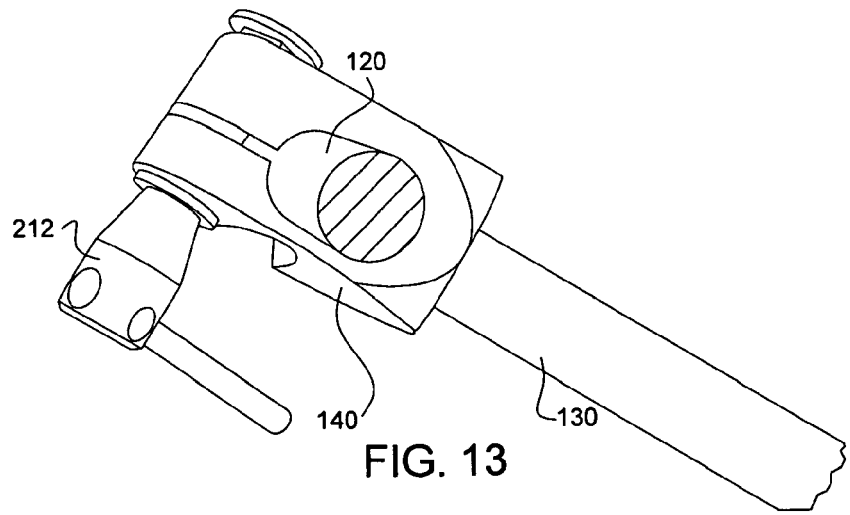
FIG. 13 is a cross-sectional view taken along line 13-13 of FIG. 12.
Figure 14:
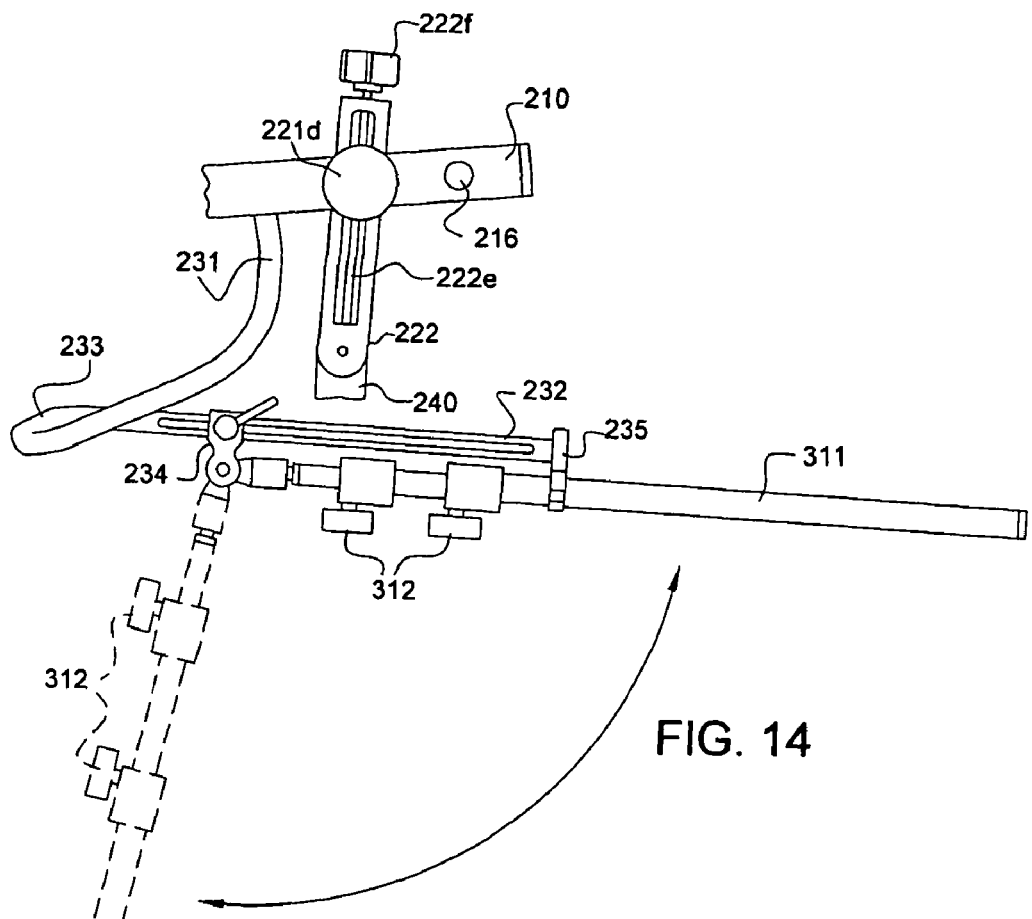
FIG. 14 is a partial side elevational view of the camera rig shown in FIG. 1, showing different positions of the monopod.
Figure 15:
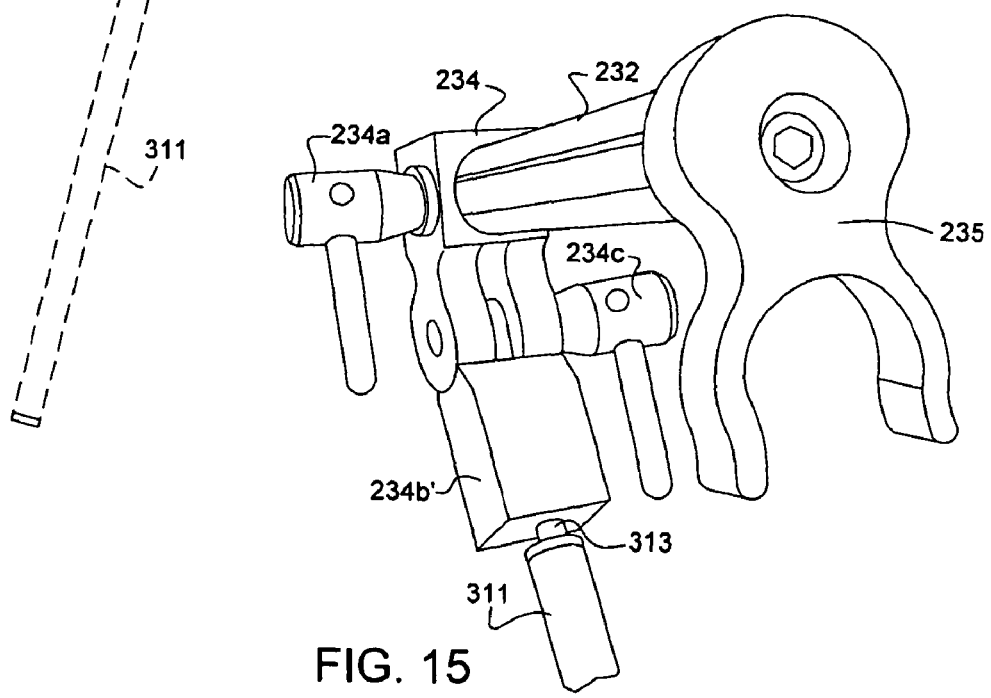
FIG. 15 is a partial side perspective view of the camera rig shown in FIG. 10, showing the accessory mount and its adjustment mechanism.

The suspension arm 210 has a socket 211 in a socket housing 212 at its proximal end for slidably receiving the attachment arm 130 of the shoulder platform 100. A locking screw, locking lever, or the like 213 is provided, which can be loosened to allow sliding adjustment and tightened to lock the suspension arm 210 in place relative to the attachment arm 130. Further, the socket 211 can be rotatably mounted in the socket housing 212 to permit pivoting of the attachment arm 130 relative to the suspension arm 210 about an axis perpendicular thereto, with a release knob to loosen the socket 211 for pivoting and to lock it in place following adjustment. As shown in FIGS. 11 and 12, the release knob and socket housing 212 can be provided with mating teeth 215 to permit defined relative rotation therebetween. The suspension arm 210 also has a plurality of apertures 216 at its distal end, aligned on its longitudinal axis, for a purpose to be described hereinafter.

The center-of-gravity correction system 220 includes a support rod 221 having first and second ends 221a and 221b, a carrier arm 222 having upper and lower ends 222a and 222b and pivotally mounted to the first end 221a of the support rod 221, a camera mounting rod 223 fixedly attached to and extending at a right angle from the lower end of the carrier arm 222, and a conventional camera plate 224 slidably mounted on the camera mounting rod 223 via a camera strut 225. The second end of the support rod 221 is insertable into the apertures 216 in the distal end of the suspension arm 210, so that its position can be adjusted along the longitudinal axis of the suspension arm 210. A removable locking screw or the like 221d is provided to permit the support rod 221 to be moved between the apertures 216 and to lock the support rod 221 in place in the selected aperture 216. The support rod 221 is also rotatable relative to the suspension arm 210. A locking screw, locking lever, or the like 221e is provided for locking the support rod 221 against rotation relative to the suspension arm 210 once position of the suspension arm 210 has been adjusted.

Fore-aft balance is conventionally achieved by adjusting the quick-release slide plate 224a of the camera plate 224. More specifically, a quick release pin 224b allows the user to move the quick-release slide plate 224a forward and backward on the base 224c of the camera plate 224 to adjust the camera balance. The slide plate 224a also includes multiple positions for the locking screw to attach the camera thereto. A more detailed description is found in application Ser. No. 12/384,492.

By appropriate adjustment of the carrier arm 222 on the support rod 221 and of the camera on the camera plate 224, the center-of-gravity correction system 220 permits the camera to be mounted on the camera rig 10 at a point where its center of gravity is balanced.

The camera platform 200 is vertically adjustable relative to the camera's tilt axis by movement of the carrier arm 222 relative to the support rod 221 along the longitudinal axis of the carrier arm 222. In one embodiment, the carrier arm 222 is provided with an elongated longitudinal aperture 222c, in which the second end of the support rod 221 is slidably engaged, a conventional locking lever or the like 222d being provided to selectively lock the carrier arm 222 relative to the second end of the support rod 221. In another embodiment, an externally threaded screw 222e is positioned along the axis of the carrier arm's aperture 222c. The support rod 221 has a threaded aperture 221c for engagement with the screw 222e, so that rotation of the screw 222e (for example, by a knob 222f attached to the end of the screw 222e at the end of the carrier arm 222) provides fine control of movement of the support rod 221 along the screw 222e.

Vertical adjustment of the camera platform 200 relative to the tilt axis allows the user to find the camera's center of gravity and fix it directly on the tilt axis, unlike other supports that mount the camera at a non-adjustable vertical position well above the tilt axis. Balancing the camera's center of gravity on the tilt axis prevents the inherently top-heavy loading that makes tilting on other camera supports unstable, as the center of gravity shifts during tilt moves. The ability to balance the camera vertically and horizontally allows the user to tilt the camera (by moving the handles 240 backward or forward) with little effort and apparent weightlessness.

The camera strut 225 on which the camera plate 224 is mounted has a socket 225a therein for sliding engagement with the camera mounting rod 223, whereby horizontal adjustment of the camera plate 224 can be made, for example, to allow the user to comfortably view the LCD screen of the camera. The socket 225a and the camera mounting rod 223 are configured to limit horizontal travel of the camera strut 225 along the longitudinal axis of the camera mounting rod 223, and also to prevent rotation of the camera strut 225 around the longitudinal axis of the camera mounting rod 223, for example via a notch 223a in the surface of the camera mounting rod 223 and a mating face 225b in the socket 225a of the camera strut 225. A locking screw, locking lever, or the like 225c is provided on the camera strut 225 for locking the camera strut 225 in place at a selected location along the camera mounting rod 223.

A rotating accessory mount 226 provided at the free end of the camera mounting rod 223 permits mounting of lights, monitors, microphones, and the like to the camera platform 200. The camera mounting rod 223 also is provided with handles 240 at either end of the notch, inwardly from the carrier arm 222 and the accessory mount 226.

The curved support leg 230 has linear upper and lower portions 231 and 232 and a curved intermediate portion 233 joining the upper and lower portions 231 and 232. The linear upper portion 231 is substantially perpendicular to the suspension arm 210 (that is, in use, it is oriented in a substantially vertical position) and fixedly connected to the suspension arm 210. The lower portion 232 of the curved support leg 230 extends skew (in the geometric sense) to the upper portion 231, such that the projection of the upper and lower portions 231 and 232 onto a plane forms an angle of somewhat greater than 90° (for example, about 100°). The intermediate portion 233 is convexly curved towards the user (that is, the open portion of the curve faces away from the user).

A socket member 234 is slidably mounted on the lower portion 232 of the curved support leg 230, for connection to the abdominal support system 300. The socket member 234 includes a locking lever or the like 234a for locking the socket member 234 in a selected location on the lower portion of the curved support leg 230. A clip 235 can also be provided at the lower end of the curved support leg 230, for a purpose to be described hereinafter in connection with FIG. 16.

The abdominal support system 300 includes at least one spring-loaded, telescopic, suspension rod 310 and a hip belt 320 with a holster 321 for receiving the lower end of the at least one suspension rod 310. Each suspension rod 310 is constructed from two adjustable, spring-loaded, telescopic sections 311, and distributes the camera weight while providing shock absorption to negate camera shakes and bounces. Tension knobs 312 on each suspension rod 310 can be loosened to engage the spring rod (not shown) with the weight of the camera platform 200, dampening movement and negating camera shake; or the tension knobs 312 can be tightened to lock the telescoping sections in place. The knobs can be adjusted independently for a variable amount of dampening. With the tension knobs 312 loosened, the abdominal support system 300 can remain connected to the camera platform 200 while the suspension rod 310 telescopes in and out. The tension knobs 312 also enable the abdominal support system 300 to remain connected to the camera platform 200 and the suspension rod 310 to be locked in place to allow the user to rest the camera rig 10 on the suspension rod 310, freeing one hand.

Each suspension rod 310 also includes a narrow tip 313 at its upper end. In one embodiment (shown in FIGS. 1-9), the socket member 234 has a flexible spring cup 234b at its lower end, for receiving the narrow tip 313 at the upper end of the suspension rod 310. The flexible spring cup 234b allows the angle of the suspension rod 310 to be easily adjusted. In another embodiment (shown in FIGS. 10-16), the socket member 234 has a pivotable cup 234b' at its lower end, and the narrow tip 313 of the suspension rod 310 is sized for a friction fit in the cup 234b'. A locking lever 234c or the like fixes the position of the cup 234b' longitudinally along the lower portion of the curved support leg 230, but does not lock the angular position of the cup 234b' (that is, it leaves the cup 234b' free to rotate with the movement of the suspension pod). The socket member 234 can be constructed to accommodate either one or two suspension rods 310. Attachment of the abdominal support system 300 to the curved support leg 230 via the socket member 234 allows the camera platform 200 to be supported without affecting movement of the center-of-gravity correction system 220.

Figure 16:
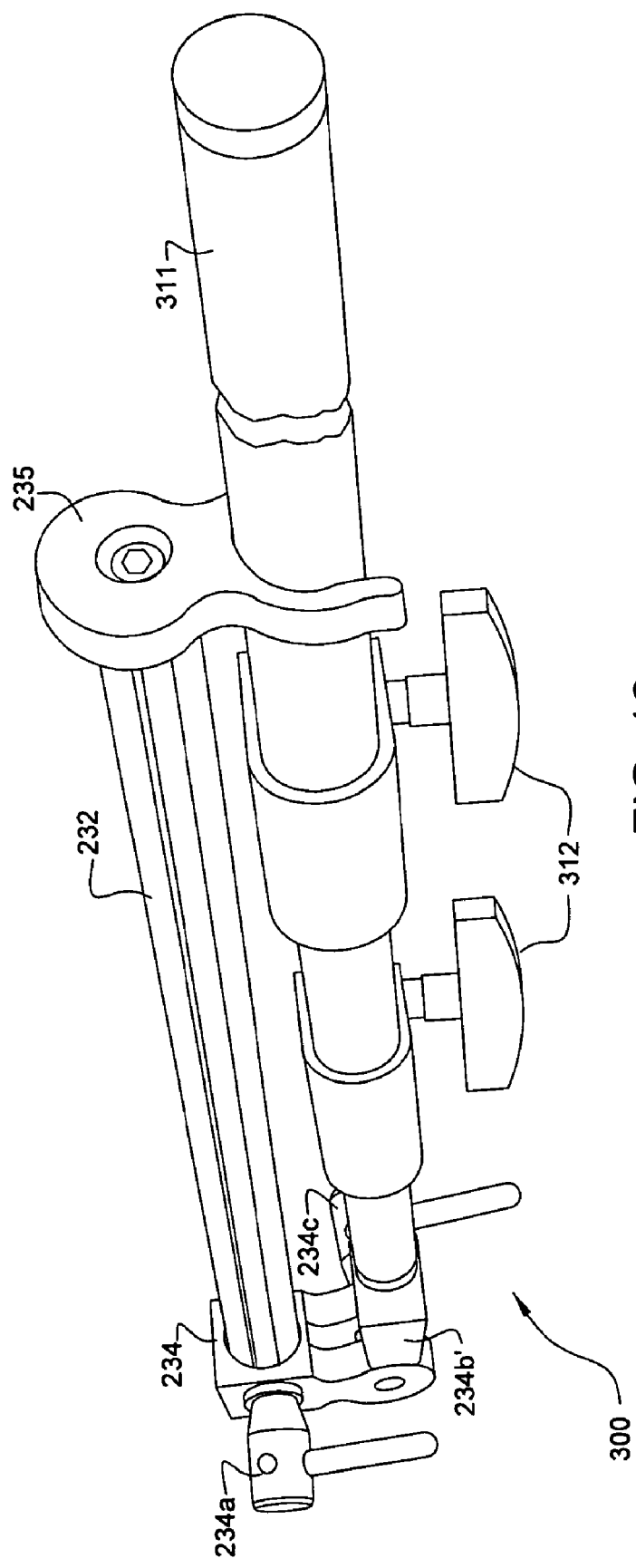
FIG. 16 is a perspective view showing the suspension rod of the camera rig of FIG. 10, in its fully collapsed position, snapped into the clip at the free end of the camera mounting rod.
Figure 17:
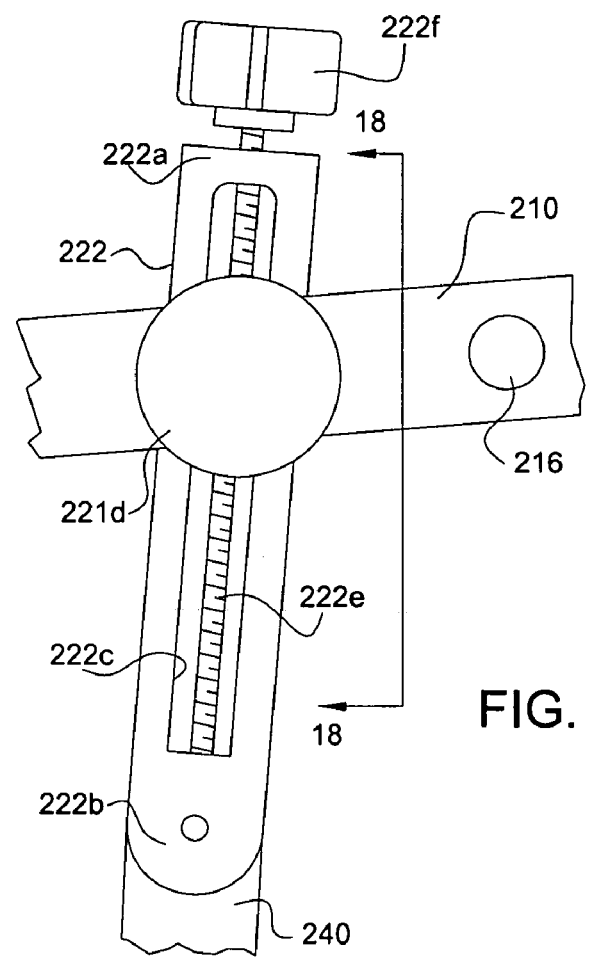
FIG. 17 is an enlarged view of adjustment mechanism on the handle.
Figure 18:
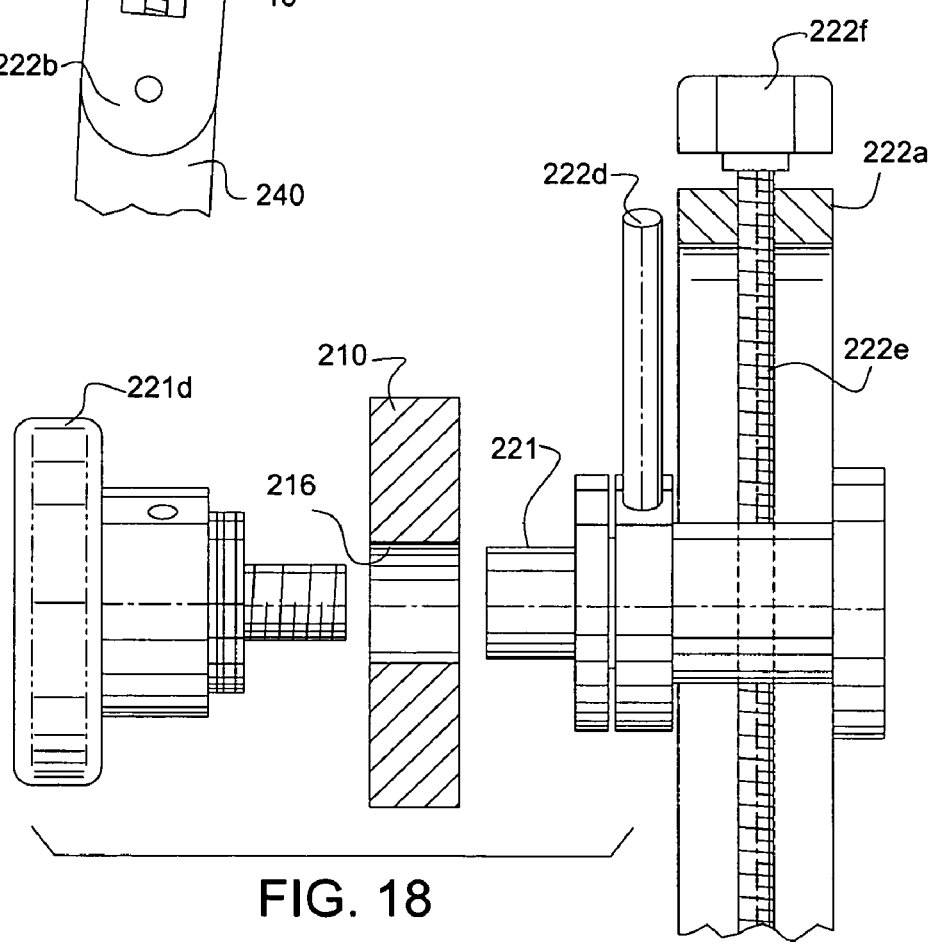
FIG. 18 is a cross-sectional view taken along line 18-18 of FIG. 17.
Figure 19:
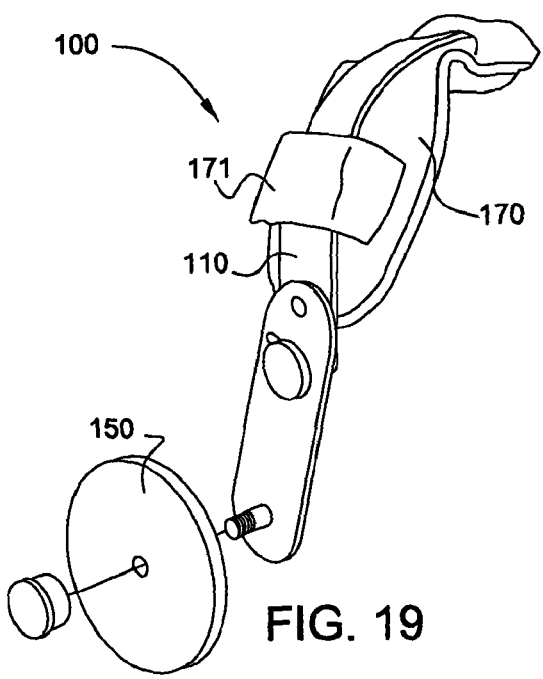
FIGS. 19-22 illustrate replacement of the counterweight with a battery mounting plate at the back of the shoulder arch, in the camera rig of FIGS. 1 and 10.
Figure 20:
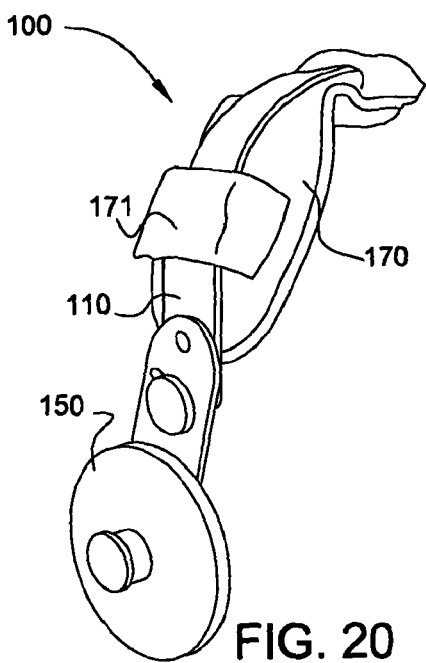
Figure 21:
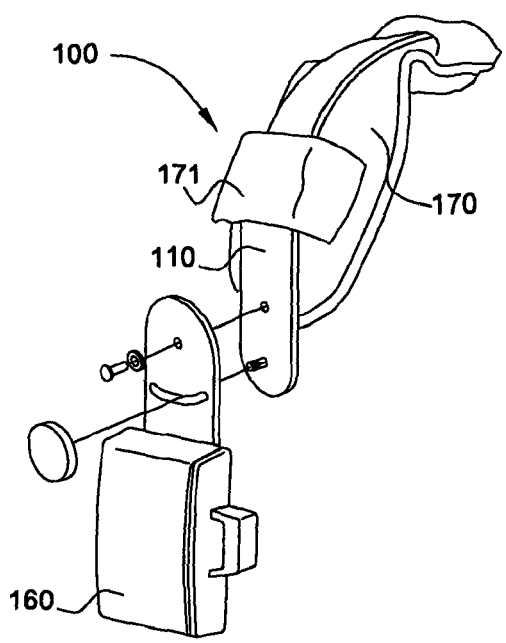
Figure 22:
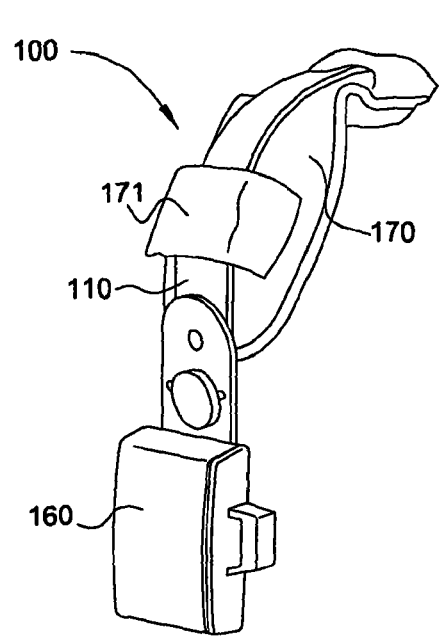

The telescoping mechanism of the suspension rod 310 allows smooth control over the height of the shot, allowing the user to shoot at the eye level of the subject without uncomfortable bending at the waist, or to shoot over a crowd of people by simply raising the camera. In addition, when the suspension rod 310 is in its fully collapsed position, the user can snap it into the clip 235 as shown in FIG. 16, so that he or she does not have to hold the suspension rod 310 while donning or removing the adjustable should platform 100.

To use the rig 10, the user assembles the suspension rod or rods 310 to the socket member 234, puts on the belt and holster 321, places the shoulder platform 100 over his or her shoulder, and places the lower end of the suspension rod or rods 310 in the holster 321. The user can then mount the camera on the camera plate 224 of the camera platform 200, adjust the center-of-gravity correction system 220, and make other adjustments as necessary.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A camera support rig comprising:
   with a center-of-gravity correction system,
   a shoulder platform including a shoulder arch configured to rest over a user's shoulder;
   a camera platform connected to the shoulder platform, the camera platform including means for correcting for the center of gravity of a camera mounted thereon and being vertically, horizontally, and pivotably movable relative to the shoulder platform; and
   an abdominal support system connected to the camera platform, the abdominal support system being horizontally and vertically adjustable relative to the camera platform.

2. The camera support system of claim 1, wherein the camera platform includes a curved support leg connecting the center-of-gravity correction system to the abdominal support system, the curved support leg having linear upper and lower portions and a curved intermediate portion joining the upper and lower portions, the linear upper portion being oriented in a substantially vertical position in use, the lower portion extending skew to the upper portion, such that a projection of the upper and lower portions onto a plane forms an angle greater than 90°, and the intermediate portion being convexly curved towards the user.

* * * * *